(12) United States Patent
Takagi et al.

(10) Patent No.: US 8,601,011 B2
(45) Date of Patent: Dec. 3, 2013

(54) DETAILED DATA AGGREGATION APPARATUS AND METHOD

(75) Inventors: Yoshihiro Takagi, Kawasaki (JP); Masayuki Miura, Kawasaki (JP); Katsumi Goto, Fukuoka (JP); Takuya Koga, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 778 days.

(21) Appl. No.: 12/457,806

(22) Filed: Jun. 22, 2009

(65) Prior Publication Data

US 2009/0271441 A1    Oct. 29, 2009

Related U.S. Application Data

(63) Continuation of application No. PCT/JP2006/325865, filed on Dec. 26, 2006.

(51) Int. Cl.
G06F 17/30    (2006.01)

(52) U.S. Cl.
USPC .............................. 707/758; 726/1; 345/619

(58) Field of Classification Search
None
See application file for complete search history.

(56) References Cited

U.S. PATENT DOCUMENTS

| | | | |
|---|---|---|---|
| 8,522,194 B2 * | 8/2013 | Kaetker et al. | 717/104 |
| 2002/0099691 A1 * | 7/2002 | Lore et al. | 707/2 |
| 2004/0015497 A1 * | 1/2004 | Swarna et al. | 707/6 |
| 2005/0149491 A1 * | 7/2005 | Bakalash et al. | 707/2 |
| 2006/0136602 A1 | 6/2006 | Araki et al. | |
| 2007/0180490 A1 * | 8/2007 | Renzi et al. | 726/1 |

FOREIGN PATENT DOCUMENTS

| | | |
|---|---|---|
| JP | 10-289386 | 10/1998 |
| JP | 2006-155081 | 6/2006 |
| JP | 2006-331181 | 12/2006 |
| WO | 2005/106711 A1 | 11/2005 |

OTHER PUBLICATIONS

Notice of Rejection, mailed Apr. 12, 2011, in corresponding Japanese Application No. 2008-550944 (5 pp.).
International Search Report for PCT/JP2006/325865, mailed Jan. 30, 2007.
European Search Report dated Aug. 19, 2011 in corresponding European Patent Application 06843249.1.

* cited by examiner

*Primary Examiner* — Shyue Jiunn Hwa
(74) *Attorney, Agent, or Firm* — Staas & Halsey LLP

(57) ABSTRACT

A detailed data aggregation apparatus holds detailed data of a plurality of events and a transcription and replenishment rule. In the rule, a plurality of common items, which are common to different events as a minimum unit of aggregation, are defined, and a transcription instruction (for instructing to transcribe a value corresponding to an event definition item to a value corresponding to the common item) and a replenishment instruction (for instructing to replenish a value to be replenished as the value corresponding to the common item) are described, associated with each common item for each event. Regarding the held detailed data, transcribed/replenished detailed data including values corresponding to the common items is created from the respective detailed data according to the transcription instruction or replenishment instruction. The apparatus aggregates the created data in a unit of predetermined common item specified as a unit of aggregation or in a unit of combination of predetermined common items.

12 Claims, 10 Drawing Sheets

FIG.3

| | | MANAGEMENT ITEM | | COMMON ITEM BETWEEN RULES | | DETAILED DATA HOLDING UNIT | | | EVENT DEFINITION ITEM | | | |
|---|---|---|---|---|---|---|---|---|---|---|---|---|
| | | INPUT MANAGEMENT NUMBER | INPUT SYSTEM CATEGORY | DEPARTMENT CODE | TRANS-ACTION DATE | ACCOUNT TITLE | SLIP No | AMOUNT | | | | |
| (1) | | N0001 | 08 BUDGET | DEVELOPMENT DEPARTMENT | 1 MARCH | 80909 AMOUNT OF SALES | Y001 | ¥6,000,000 | | | | |
| (2) | | N0001 | 08 BUDGET | DEVELOPMENT DEPARTMENT | 1 MARCH | 80909 AMOUNT OF SALES | Y002 | ¥4,000,000 | | | | |
| (3) | | N0001 | 08 BUDGET | DEVELOPMENT DEPARTMENT | 1 MARCH | 80909 AMOUNT OF SALES | Y003 | ¥800,000 | | | PREDICTED COST | SCHEDULED DATE FOR SALES |
| | | | | | | | | | | | ¥800,000 | 30 JUN |
| | | INPUT MANAGEMENT NUMBER | INPUT SYSTEM CATEGORY | DEPARTMENT CODE | TRANS-ACTION DATE | SLIP No | AMOUNT | SLIP NOTE | | | | |
| (4) | | N0002 | 01 ORDER ACCEPTANCE | DEVELOPMENT DEPARTMENT | 1 APRIL | J001 | ¥1,000,000 | CONSTRUCTION OF MANAGEMENT SYSTEM | | | | |
| | | INPUT MANAGEMENT NUMBER | INPUT SYSTEM CATEGORY | DEPARTMENT CODE | TRANS-ACTION DATE | SLIP No | AMOUNT | SLIP CATEGORY | SCHEDULED DATE FOR ACCEPTANCE | | | |
| (5) | | N0003 | 06 SUBCONTRACT COST | DEVELOPMENT DEPARTMENT | 5 APRIL | G005 | ¥30,000 | 01 ORDER PLACEMENT | 25 JUN | | | |
| (12) | | N0009 | 06 SUBCONTRACT COST | DEVELOPMENT DEPARTMENT | 25 JUNE | G006 | ¥30,000 | 02 ACCEPTANCE | 25 JUN | | | |
| | | INPUT MANAGEMENT NUMBER | INPUT SYSTEM CATEGORY | DEPARTMENT CODE | TRANS-ACTION DATE | SLIP No | AMOUNT | EMPLOYEE | | | | |
| (6) | | N0004 | 03 OPERATION | DEVELOPMENT DEPARTMENT | 30 APRIL | W003 | ¥1,000,000 | 201121 | | | | |
| (9) | | N0007 | 03 OPERATION | DEVELOPMENT DEPARTMENT | 31 MAY | W004 | ¥1,200,000 | 201234 | | | | |
| (13) | | N0010 | 03 OPERATION | DEVELOPMENT DEPARTMENT | 30 JUNE | W005 | ¥1,500,000 | 201234 | | | | |
| (14) | | N0010 | 03 OPERATION | DEVELOPMENT DEPARTMENT | 30 JUNE | W006 | ¥1,000,000 | 201121 | | | | |
| | | INPUT MANAGEMENT NUMBER | INPUT SYSTEM CATEGORY | DEPARTMENT CODE | TRANS-ACTION DATE | SLIP No | AMOUNT | EMPLOYEE | DESTINATION OF BUSINESS TRIP | | | |
| (7) | | N0005 | 04 TRAVEL EXPENSES | DEVELOPMENT DEPARTMENT | 10 MAY | R004 | ¥50,000 | 201234 | OSAKA | | | |
| (11) | | N0008 | 04 TRAVEL EXPENSES | DEVELOPMENT DEPARTMENT | 20 JUNE | R005 | ¥50,000 | 201121 | TOKYO | | | |
| | | INPUT MANAGEMENT NUMBER | INPUT SYSTEM CATEGORY | DEPARTMENT CODE | TRANS-ACTION DATE | SLIP No | AMOUNT | SLIP CATEGORY | SCHEDULED DATE FOR ACCEPTANCE | | | |
| (8) | | N0006 | 05 MATERIAL COST | DEVELOPMENT DEPARTMENT | 20 MAY | H001 | ¥100,000 | 01 ORDER PLACEMENT | 20 JUN | | | |
| (10) | | N0008 | 05 MATERIAL COST | DEVELOPMENT DEPARTMENT | 20 JUNE | H001 | ¥100,000 | 02 ACCEPTANCE | 20 JUN | | | |
| | | INPUT MANAGEMENT NUMBER | INPUT SYSTEM CATEGORY | DEPARTMENT CODE | TRANS-ACTION DATE | SLIP No | AMOUNT | SLIP NOTE | | | | |
| (15) | | N0010 | 02 SALES | DEVELOPMENT DEPARTMENT | 30 JUNE | U002 | ¥1,000,000 | CONSTRUCTION OF MANAGEMENT SYSTEM | | | | |
| | | INPUT MANAGEMENT NUMBER | INPUT SYSTEM CATEGORY | DEPARTMENT CODE | TRANS-ACTION DATE | SLIP No | AMOUNT | | | | | |
| (16) | | N0011 | 07 ORDER | DEVELOPMENT DEPARTMENT | 2 JULY | O001 | ¥800,000 | | | | | |

CORE SYSTEM (EVENT):
- BUDGET
- ORDER ACCEPTANCE
- SUBCONTRACT COST
- WORKSHEET
- SETTLEMENT OF TRAVEL EXPENSES
- MATERIAL COST OR THE LIKE
- SALES

FIG.4

| INPUT SYSTEM CATEGORY | RECORDED IDENTIFICATION CATEGORY | COMMON ITEMS ||| ... |
| --- | --- | --- | --- | --- | --- |
| | | ACCOUNT | RECORDED DATE | AMOUNT | |
| 08 BUDGET | 04 BUDGET | TRANSCRIBE "ACCOUNT" | TRANSCRIBE "RECORDED DATE" | TRANSCRIBE "AMOUNT" | ... |
| 01 ORDER ACCEPTANCE | 02 ACCEPTANCE AND ORDER PLACEMENT | 80909 AMOUNT OF SALES | TRANSCRIBE "SCHEDULED DATE FOR SALES" | TRANSCRIBE "AMOUNT" | ... |
| 02 SALES | 01 RECORD | 80909 AMOUNT OF SALES | TRANSCRIBE "RECORDED DATE" | TRANSCRIBE "AMOUNT" | ... |
| ... | | | ... | | |

FIG.5

| | MANAGEMENT ITEM | | COMMON ITEM | | | | | COMMON ITEM BETWEEN RULES | | EVENT DEFINITION ITEM | | | |
|---|---|---|---|---|---|---|---|---|---|---|---|---|---|
| | INPUT MANAGEMENT NUMBER | INPUT SYSTEM CATEGORY | RECORDED IDENTIFICATION CATEGORY | ACCOUNT TITLE | RECORDED DATE | MONTH | SEGMENT | DEPARTMENT CODE | TRANSACTION DATE | SLIP NUMBER | AMOUNT | EMPLOYEE | SLIP NOTE (SPECIFIC TO ORDER ACCEPTANCE/SALES) |
| (1) | N0001 | 08 BUDGET | 04 BUDGET | 80909 AMOUNT OF SALES | 30 JUNE | JUNE | CA103030 | DEVELOPMENT DEPARTMENT | 1 MARCH | Y001 | ¥5,000,000 | | |
| (2) | N0001 | 08 BUDGET | 04 BUDGET | 81011 SALES COST STANDARD ACCOUNT | 30 JUNE | JUNE | CA103030 | DEVELOPMENT DEPARTMENT | 1 MARCH | Y002 | ¥4,000,000 | | |
| (3) | N0001 | 08 BUDGET | 04 BUDGET | 83101 ENTRY OF PURPOSE OF SALES COST | 30 JUNE | JUNE | BK200010 | DEVELOPMENT DEPARTMENT | 1 MARCH | Y003 | ¥800,000 | | |
| (4) | N0002 | 01 ORDER ACCEPTANCE | 02 ACCEPTANCE AND ORDER PLACEMENT | 80909 AMOUNT OF SALES | 30 JUNE | JUNE | CA103030 | DEVELOPMENT DEPARTMENT | 1 APRIL | J001 | ¥1,000,000 | | CONSTRUCTION OF MANAGEMENT SYSTEM |
| (4)-1 | N0002 | 01 ORDER ACCEPTANCE | 02 ACCEPTANCE AND ORDER PLACEMENT | 81011 SALES COST STANDARD ACCOUNT | 30 JUNE | JUNE | CA103030 | DEVELOPMENT DEPARTMENT | 1 APRIL | J001 | ¥800,000 | | |
| (5) | N0003 | 06 SUBCONTRACT COST | 02 ACCEPTANCE AND ORDER PLACEMENT | 12021 WORK-IN-PROCESS GENERAL ACCOUNT | 30 JUNE | JUNE | CA103030 | DEVELOPMENT DEPARTMENT | 5 APRIL | H002 | ¥30,000 | | |
| (6) | N0004 | 03 OPERATION | 01 RECORD | 12021 WORK-IN-PROCESS GENERAL ACCOUNT | 30 JUNE | JUNE | CA103030 | DEVELOPMENT DEPARTMENT | 30 APRIL | W003 | ¥100,000 | 201121 | |
| (7) | N0005 | 04 TRAVEL EXPENSES | 01 RECORD | 12021 WORK-IN-PROCESS GENERAL ACCOUNT | 30 JUNE | JUNE | CA103030 | DEVELOPMENT DEPARTMENT | 10 MAY | R004 | ¥50,000 | 201234 | |
| (8) | N0006 | 05 MATERIAL COST | 02 ACCEPTANCE AND ORDER PLACEMENT | 12021 WORK-IN-PROCESS GENERAL ACCOUNT | 30 JUNE | JUNE | CA103030 | DEVELOPMENT DEPARTMENT | 20 MAY | H001 | ¥100,000 | | |
| (9) | N0007 | 03 OPERATION | 01 RECORD | 12021 WORK-IN-PROCESS GENERAL ACCOUNT | 30 JUNE | JUNE | CA103030 | DEVELOPMENT DEPARTMENT | 31 MAY | W004 | ¥120,000 | 201234 | |
| (10) | N0008 | 05 MATERIAL COST | 03 RECONCILEMENT OF ORDER | 12021 WORK-IN-PROCESS GENERAL ACCOUNT | 30 JUNE | JUNE | CA103030 | DEVELOPMENT DEPARTMENT | 20 JUNE | Z005 | ¥100,000 | | |
| (10)-1 | N0008 | 05 MATERIAL COST | 01 RECORD | 12021 WORK-IN-PROCESS GENERAL ACCOUNT | 30 JUNE | JUNE | CA103030 | DEVELOPMENT DEPARTMENT | 20 JUNE | H001 | -¥100,000 | 201121 | |
| (11) | N0008 | 04 TRAVEL EXPENSES | 02 ACCEPTANCE AND ORDER PLACEMENT | 83101 ENTRY OF PURPOSE OF SALES COST | 20 JUNE | JUNE | BK200010 | DEVELOPMENT DEPARTMENT | 20 JUNE | R005 | ¥50,000 | | |
| (12) | N0009 | 06 SUBCONTRACT COST | 01 RECORD | 12021 WORK-IN-PROCESS GENERAL ACCOUNT | 30 JUNE | JUNE | CA103030 | DEVELOPMENT DEPARTMENT | 25 JUNE | G006 | ¥30,000 | | |
| (12)-1 | N0009 | 06 SUBCONTRACT COST | 03 RECONCILEMENT OF ORDER | 12021 WORK-IN-PROCESS GENERAL ACCOUNT | 30 JUNE | JUNE | CA103030 | DEVELOPMENT DEPARTMENT | 25 JUNE | H002 | -¥30,000 | | |
| (13) | N0010 | 03 OPERATION | 01 RECORD | 12021 WORK-IN-PROCESS GENERAL ACCOUNT | 30 JUNE | JUNE | CA103030 | DEVELOPMENT DEPARTMENT | 30 JUNE | W005 | ¥150,000 | 201234 | |
| (14) | N0010 | 03 OPERATION | 01 RECORD | 83101 ENTRY OF PURPOSE OF SALES COST | 30 JUNE | JUNE | BK200010 | DEVELOPMENT DEPARTMENT | 30 JUNE | W006 | ¥100,000 | 201121 | |
| (15) | N0010 | 02 SALES | 01 RECORD | 80909 AMOUNT OF SALES | 30 JUNE | JUNE | CA103030 | DEVELOPMENT DEPARTMENT | 30 JUNE | U002 | ¥1,000,000 | | CONSTRUCTION OF MANAGEMENT SYSTEM |
| (15)-1 | N0010 | 02 SALES | 01 RECORD | 80909 AMOUNT OF SALES | 30 JUNE | JUNE | CA103030 | DEVELOPMENT DEPARTMENT | 2 JULY | J001 | -¥1,000,000 | | |
| (16) | N0011 | 07 ORDER | 01 RECORD | 81011 SALES COST STANDARD ACCOUNT | 30 JUNE | JUNE | CA103030 | DEVELOPMENT DEPARTMENT | 2 JULY | O001 | ¥800,000 | | |
| (16)-1 | N0011 | 07 ORDER | 03 RECONCILEMENT OF ORDER | 81011 SALES COST STANDARD ACCOUNT | 30 JUNE | JUNE | CA103030 | DEVELOPMENT DEPARTMENT | 2 JULY | J001 | -¥800,000 | | |

FIG.6

AGGREGATE RESULT 1 (ANALYSIS BY DEPARTMENTAL)
(AGGREGATE AMOUNT BY RECORDED IDENTIFICATION CATEGORY,
ACCOUNT, MONTH, AND DEPARTMENT CODE)

| No | COMMON ITEM | | | COMMON ITEM BETWEEN RULES | EVENT DEFINITION ITEM | |
|---|---|---|---|---|---|---|
| | RECORDED IDENTIFICATION CATEGORY | ACCOUNT | MONTH | DEPARTMENT CODE | AMOUNT | |
| (5)(8) | 02 ACCEPTANCE AND ORDER PLACEMENT | 12021 WORK-IN-PROCESS GENERAL ACCOUNT | JUNE | DEVELOPMENT DEPARTMENT | ¥130,000 | (a) |
| (10)-1(12)-1 | 03 RECONCILEMENT OF ORDER | 12021 WORK-IN-PROCESS GENERAL ACCOUNT | JUNE | DEVELOPMENT DEPARTMENT | -¥130,000 | (b) |
| (6)(7)(9)(10)(12)(13) | 01 RECORD | 12021 WORK-IN-PROCESS GENERAL ACCOUNT | JUNE | DEVELOPMENT DEPARTMENT | ¥550,000 | (c) |
| (15) | 01 RECORD | 80909 AMOUNT OF SALES | JUNE | DEVELOPMENT DEPARTMENT | ¥1,000,000 | (d) |
| (4) | 02 ACCEPTANCE AND ORDER PLACEMENT | 80909 AMOUNT OF SALES | JUNE | DEVELOPMENT DEPARTMENT | ¥1,000,000 | (e) |
| (15)-1 | 03 RECONCILEMENT OF ORDER | 80909 AMOUNT OF SALES | JUNE | DEVELOPMENT DEPARTMENT | -¥1,000,000 | (f) |
| (1) | 04 BUDGET | 80909 AMOUNT OF SALES | JUNE | DEVELOPMENT DEPARTMENT | ¥5,000,000 | (g) |
| (16) | 01 RECORD | 81011 SALES COST STANDARD ACCOUNT | JUNE | DEVELOPMENT DEPARTMENT | ¥800,000 | (h) |
| (4)-1 | 02 ACCEPTANCE AND ORDER PLACEMENT | 81011 SALES COST STANDARD ACCOUNT | JUNE | DEVELOPMENT DEPARTMENT | ¥800,000 | (i) |
| (16)-1 | 03 RECONCILEMENT OF ORDER | 81011 SALES COST STANDARD ACCOUNT | JUNE | DEVELOPMENT DEPARTMENT | -¥800,000 | (j) |
| (2) | 04 BUDGET | 81011 SALES COST STANDARD ACCOUNT | JUNE | DEVELOPMENT DEPARTMENT | ¥4,000,000 | (k) |
| (11)(14) | 01 RECORD | 83101 ENTRY OF PURPOSE OF SALES COST | JUNE | DEVELOPMENT DEPARTMENT | ¥150,000 | (l) |
| (3) | 04 BUDGET | 83101 ENTRY OF PURPOSE OF SALES COST | JUNE | DEVELOPMENT DEPARTMENT | ¥800,000 | (m) |

FIG.7

AGGREGATE RESULT 2 (ANALYSIS BY SEGMENT)
(AGGREGATE AMOUNT BY RECORDED IDENTIFICATION CATEGORY, ACCOUNT, MONTH, AND SEGMENT)

| No | COMMON ITEM | | | | EVENT DEFINITION ITEM | |
|---|---|---|---|---|---|---|
| | RECORDED IDENTIFICATION CATEGORY | ACCOUNT | MONTH | SEGMENT | AMOUNT | |
| (6)(7)(9)(10)(12)(13) | 01 RECORD | 12021 WORK-IN-PROCESS GENERAL ACCOUNT | JUNE | CA103030 | ¥550,000 | (a) |
| (5)(8) | 02 ACCEPTANCE AND ORDER PLACEMENT | 12021 WORK-IN-PROCESS GENERAL ACCOUNT | JUNE | CA103030 | ¥130,000 | (b) |
| (10)-1(12)-1 | 03 RECONCILEMENT OF ORDER | 12021 WORK-IN-PROCESS GENERAL ACCOUNT | JUNE | CA103030 | -¥130,000 | (c) |
| (15) | 01 RECORD | 80909 AMOUNT OF SALES | JUNE | CA103030 | ¥1,000,000 | (d) |
| (4) | 02 ACCEPTANCE AND ORDER PLACEMENT | 80909 AMOUNT OF SALES | JUNE | CA103030 | ¥1,000,000 | (e) |
| (15)-1 | 03 RECONCILEMENT OF ORDER | 80909 AMOUNT OF SALES | JUNE | CA103030 | -¥1,000,000 | (f) |
| (1) | 04 BUDGET | 80909 AMOUNT OF SALES | JUNE | CA103030 | ¥5,000,000 | (g) |
| (16) | 01 RECORD | 81011 SALES COST STANDARD ACCOUNT | JUNE | CA103030 | ¥800,000 | (h) |
| (4)-1 | 02 ACCEPTANCE AND ORDER PLACEMENT | 81011 SALES COST STANDARD ACCOUNT | JUNE | CA103030 | ¥800,000 | (i) |
| (16)-1 | 03 RECONCILEMENT OF ORDER | 81011 SALES COST STANDARD ACCOUNT | JUNE | CA103030 | -¥800,000 | (j) |
| (2) | 04 BUDGET | 81011 SALES COST STANDARD ACCOUNT | JUNE | CA103030 | ¥4,000,000 | (k) |
| (11)(14) | 01 RECORD | 83101 ENTRY OF PURPOSE OF SALES COST | JUNE | BK200010 | ¥150,000 | (l) |
| (3) | 04 BUDGET | 83101 ENTRY OF PURPOSE OF SALES COST | JUNE | BK200010 | ¥800,000 | (m) |

| DEPARTMENT | | SALES(n) | COST(o) | MARGIN PROFIT(p) | EXPENSE | PROFIT |
|---|---|---|---|---|---|---|
| DEVELOPMENT DEPARTMENT | BUDGET | ¥5,000,000 (g) | ¥4,000,000 (k) | ¥1,000,000 (n)-(o) | ¥800,000 (m) | ¥200,000 (p)-(m) |
| | ESTIMATION (RECORD+ACCEPTANCE AND ORDER PLACEMENT) | ¥1,000,000 (d)+(e)+(f) | ¥800,000 (h)+(i)+(j) | ¥200,000 (n)-(o) | ¥150,000 (l) | ¥50,000 (p)-(m) |

(B)

| SEGMENT | | SALES(n) | COST(o) | MARGIN PROFIT(p) | EXPENSE |
|---|---|---|---|---|---|
| CA103030 | BUDGET | ¥5,000,000 (g) | ¥4,000,000 (k) | ¥1,000,000 (n)-(o) | |
| | ESTIMATION (RECORD+ACCEPTANCE AND ORDER PLACEMENT) | ¥1,000,000 (d)+(e)+(f) | ¥800,000 (h)+(i)+(j) | ¥200,000 (n)-(o) | |
| BK200010 | BUDGET | | | | ¥800,000 (m) |
| | ESTIMATION (RECORD+ACCEPTANCE AND ORDER PLACEMENT) | | | | ¥150,000 (l) |

DETAILED DATA AGGREGATION APPARATUS AND METHOD

CROSS-REFERENCE TO RELATED APPLICATION(S)

Continuation Application Ver

This application is a continuation of PCT international application Ser. No. PCT/JP2006/325865 filed on Dec. 26, 2006 which designates the United States, incorporated herein by reference, the entire contents of which are incorporated herein by reference.

FIELD

The embodiments discussed herein are directed to a detailed data aggregation apparatus and a detailed data aggregation method.

BACKGROUND

Conventionally, use of a data warehouse (DWH) has attracted attention at the time of associating data input to a core system, which is "detailed data" having detailed contents such as a detailed statement or slip, with analysis of various business purposes. Generally, the analysis of detailed data by using a data warehouse is realized by a data warehouse stores therein the detailed data, a data mart stores therein an aggregate result obtained by aggregating the detailed data stored in the data warehouse for a desired analysis purpose, and a front-end application for analyzing the aggregate result stored in the data mart.

A method of aggregating detailed data is explained with specific examples. For example, Japanese Patent No. 3476349 discloses such a method that a data processor aggregates detailed data including common items (for example, "sales period", "product name", "sales area", "sales data", and the like) for each element corresponding to an analysis purpose (for example, 'Tokyo') based on hierarchical structure information of each item (for example, 'computer' and 'personal computer' relating to "product name", and 'nationwide', 'Kanto', or 'Tokyo' relating to "sales area"), and stores the aggregated data in a database beforehand. Further, for example, Japanese Laid-open Patent Publication No. 2001-28005 discloses such a method that a data warehouse server aggregates detailed data including common items (for example, "product code", "customer code" and the like) for each master item corresponding to the analysis purposes based on master item information of each item (for example, 'manufacturer category' and 'product name' relating to "product code", "customer name" and 'personnel code' relating to "customer code", and the like), and stores the aggregated data in a database beforehand.

In the conventional technique, detailed data respectively input to a plurality of core systems cannot be aggregated easily and flexibly corresponding to analysis purposes, and the detailed data, which is the basis of aggregated data, cannot be easily tracked.

That is, to aggregate the detailed data respectively input to the core systems, which includes items defined for each system (or event), corresponding to the analysis purposes according to the methods disclosed in Japanese Patent No. 3476349 and Japanese Laid-open Patent Publication No. 2001-28005, two-stage aggregation needs to be performed for each analysis purpose, such that aggregation of detailed data is performed for a group of detailed data including the common items (for example, detailed data input to the same system) for each element (or master item) corresponding to the analysis purpose, and the detailed data aggregated for each group is further aggregated for a plurality of groups.

Therefore, simple aggregation cannot be performed corresponding to the analysis purposes. Further, to perform aggregation corresponding to a new analysis purpose different from a presupposed purpose, the two-stage aggregation needs to be performed again. Therefore, there is a problem that flexible aggregation cannot be performed. Further, when the two-stage aggregation is performed for each analysis purpose, the detailed data, which is the basis of the aggregated data, cannot be easily tracked, because an intermediate aggregate result is not generally stored.

SUMMARY

According to an aspect of the invention, a computer readable storage medium contains instructions for aggregating detailed data between different events. Each piece of the detailed data includes a value corresponding to an event definition item defined for each event as an item constituting the data. The instructions, when executed by a computer, causes the computer to perform a detailed data holding procedure of holding detailed data of a plurality of events; a transcription/replenishment rule holding procedure of holding a transcription and replenishment rule in which a plurality of common items, which are common to different events as a minimum unit of aggregation, is defined and in which at least one of a transcription instruction and a replenishment instruction is described, associated with each common item for each event, the transcription instruction being for instructing to transcribe a value corresponding to the event definition item to a value corresponding to the common item, and the replenishment instruction being for instructing to replenish a value to be replenished as the value corresponding to the common item; a transcribed/replenished detailed-data creating procedure of creating transcribed/replenished detailed data including the value corresponding to the common item from each piece of the detailed data, by transcribing, for the common item being associated with the transcription instruction by the transcription and replenishment rule held at the transcription/replenishment rule holding procedure, the value corresponding to the event definition item constituting the detailed data as the value corresponding to the common item according to the transcription rule, and by replenishing, for the common item being associated with the replenishment instruction in the transcription and replenishment rule, a value according to the replenishment rule, with respect to each piece of the detailed data held at the detailed data holding procedure; a transcribed/replenished detailed-data holding procedure of holding the transcribed/replenished detailed data created at the transcribed/replenished detailed-data creating procedure; and an aggregating procedure of aggregating the transcribed/replenished detailed data held at the transcribed/replenished detailed-data holding procedure in a unit of a predetermined common item specified as a unit of aggregation or in a unit of combination of predetermined common items.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 3 is an explanatory diagram of a detailed data holding unit;

FIG. 4 is an explanatory diagram of a transcription/replenishment rule holding unit;

FIG. 5 is an explanatory diagram of a transcribed/replenished detailed-data holding unit;

FIG. 6 is an explanatory diagram of an aggregate-result holding unit;

FIG. 7 is an explanatory diagram of the aggregate-result holding unit;

FIG. 8 is an explanatory diagram of an analysis example;

DESCRIPTION OF EMBODIMENT(S)

Figure 1:
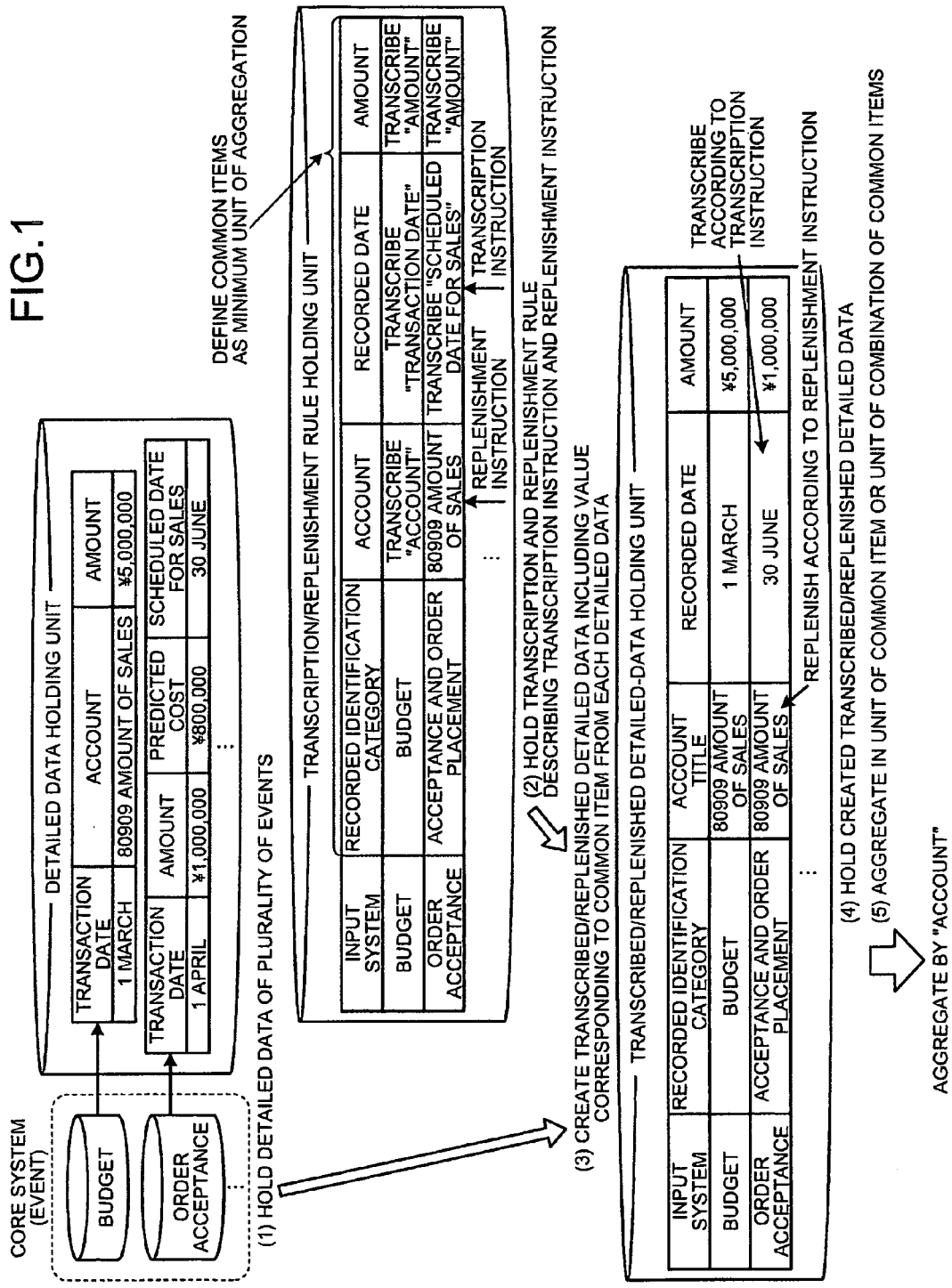
FIG. 1 is an explanatory diagram of an outline and features of a detailed data aggregation apparatus according to a first embodiment.

Preferred embodiments of a detailed data aggregation apparatus, a detailed data aggregation program, and a detailed data aggregation method according to the present invention will be explained below in detail with reference to the accompanying drawings. Main terms used in embodiments, an outline and features of a detailed data aggregation apparatus according to a first embodiment, a configuration and process procedures of the detailed data aggregation apparatus according to the first embodiment, and effects of the first embodiment are explained in this order, and then other embodiments will be explained.

[a] First Embodiment

[Explanations of Terms]

Main terms used in embodiments below are explained first. "Event" means, for example, an individual system such as "budget system", "order receiving system", or the like, or an individual process such as "order placement", "acceptance", or the like performed in one system. The present invention can be applied to any case; however, in a first embodiment, a case that the "event" means the individual system is assumed and explained.

In the following embodiments, data handled in the "event" is referred to as "detailed data". That is, when the "event" is "budget system", the "detailed data" includes items of, for example, "transaction date", "account title", and "amount", and includes, for example, "1 March" as a value corresponding to the item "transaction date", "80909 amount of sales" as a value corresponding to the item "account title", and "¥5,000,000" as a value corresponding to the item "amount". Because the "detailed data" is handled in the "event", it is considered to be items such as "transaction date", "account title", and "amount" defined in the "budget system". That is, the items constituting the "detailed data" are "event definition items" defined for each "event".

When considering aggregation of the "detailed data", it is significant undoubtedly that the "detailed data" is aggregated individually in an individual system such as "budget system" and "order receiving system", and an obtained aggregation result is analyzed. However, it is more significant that the "detailed data" handled in the "budget system" and the "detailed data" handled in the "order receiving system" are aggregated together, and the obtained aggregation result is analyzed. Specifically explaining with an example, for example, elements of "detailed data" in a system that handles a series of processes executed though multiple stages, such as the "budget system", "order receiving system", . . . , and "sales system" are aggregated together, and if the obtained aggregation result is analyzed, for example, budget/performance comparison is derived as an analysis result.

Thus, it is quite significant that the "detailed data" is aggregated between different "events", and the obtained aggregation result is analyzed. However, because the "detailed data" includes "event definition items" different for each "event", it is important how to aggregate the "detailed data" having a different configuration between the different "events".

[Outline and Feature of Detailed Data Aggregation Apparatus According to First Embodiment]

The outline and features of the detailed data aggregation apparatus according to the first embodiment are explained next with reference to FIG. 1. FIG. 1 is an explanatory diagram of the outline and features of the detailed data aggregation apparatus according to the first embodiment.

As described above, it is an outline of the detailed data aggregation apparatus according to the first embodiment that the detailed data each including a value corresponding to the event definition item defined for each event as an item constituting the data are aggregated between different events. It is a main feature of the detailed data aggregation apparatus that the detailed data respectively input to a plurality of core systems can be aggregated easily and flexibly corresponding to an analysis purpose, and the detailed data, which is the basis of the aggregated data, can be easily tracked.

The main feature is briefly explained. The detailed data aggregation apparatus according to the first embodiment holds the detailed data of a plurality of events (see (1) in FIG. 1). Specifically, as depicted in FIG. 1, a detailed data holding unit in the detailed data aggregation apparatus holds the detailed data of the events such as the detailed data (data including items "transaction date", "account title", and "amount") of the "budget system" and the detailed data (data including items "transaction date", "amount", "predicted cost", and "scheduled date for sales") of the "order receiving system".

The detailed data aggregation apparatus holds a transcription and replenishment rule (see (2) in FIG. 1). Specifically, a transcription/replenishment rule holding unit in the detailed data aggregation apparatus holds the transcription and replenishment rule in which a plurality of common items, which are common to different events as a minimum unit of aggregation, are defined and in which a transcription instruction and a replenishment instruction are described, associated with each common item for each event. The transcription instruction is for instructing to transcribe a value corresponding to the event definition item to a value corresponding to the common item, and the replenishment instruction is for instructing to replenish a value to be replenished as the value corresponding to the common item.

For example, as depicted in FIG. 1, the transcription/replenishment rule holding unit holds the transcription and replenishment rule in which "recorded identification category", "account title", "recorded date", and "amount" are defined as the common items, and the transcription instruction (for transcribing "scheduled date for sales" in the "order receiving system" described in association with the "common item "recorded date"") or the replenishment instruction ("80909 amount of sales" in the "order receiving system" described in association with the common item "account title") are described, associated with each common item for each event such as the "budget system" or the "order receiving system".

Under such a configuration, the detailed data aggregation apparatus according to the first embodiment creates transcribed/replenished detailed data including the value corresponding to the common item from each detailed data held by the detailed data holding unit (see (3) in FIG. 1). Specifically, with respect to each piece of the detailed data held by the detailed data holding unit, the detailed data aggregation apparatus transcribes a value corresponding to the event definition item constituting the detailed data as a value corresponding to the common item according to the transcription instruction, for the common item being associated with the transcription instruction in the transcription and replenishment rule held by the transcription/replenishment rule holding unit, and replenishes a value according to the replenishment instruction, for the common item being associated with the replenishment instruction in the transcription and replenishment rule, thereby creating the transcribed/replenished detailed data.

For example, in the detailed data aggregation apparatus, as depicted in FIG. 1, when referring to the transcription and replenishment rule for the common item "recorded date" with respect to the detailed data of the "order receiving system", of the detailed data held by the detailed data holding unit, the transcription instruction of 'transcribe "scheduled date for sales"' is associated with the common item "recorded date". 'Transcribe "scheduled date for sales"' means, in other words, to instruct to transcribe a value of the event definition item "scheduled date for sales" in the detailed data of the "order receiving system" as the common item "recorded date" at the time of creating the transcribed/replenished detailed data from the detailed data of the "order receiving system". Accordingly, the detailed data aggregation apparatus transcribes "30 June", which is the "scheduled date for sales" in the detailed data as the common item "recorded date".

For example, in the detailed data aggregation apparatus, as depicted in FIG. 1, when referring to the transcription and replenishment rule for the common item "account title" with respect to the detailed data of the "order receiving system", of the detailed data held by the detailed data holding unit, a replenishment instruction such as "80909 amount of sales" is associated with the common item "account title". "80809 amount of sales" means, in other words, to instruct to replenish a value of "80909 amount of sales" for the common item "account title" at the time of creating the transcribed/replenished detailed data from the detailed data of the "order receiving system". Accordingly, the detailed data aggregation apparatus replenishes "80909 amount of sales" to the common item "account title".

Subsequently, the detailed data aggregation apparatus according to the first embodiment holds the created transcribed/replenished detailed data (see (4) in FIG. 1). For example, the detailed data aggregation apparatus holds the transcribed/replenished detailed data created from the detailed data of the "budget system" or the transcribed/replenished detailed data created from the detailed data of the "order receiving system" in a transcribed/replenished detailed-data holding unit.

The detailed data aggregation apparatus then aggregates the transcribed/replenished detailed data held by the transcribed/replenished detailed-data holding unit (see (5) in FIG. 1). Specifically, the detailed data aggregation apparatus aggregates the transcribed/replenished detailed data in a unit of a common item specified as a unit of aggregation or in a unit of combination of common items. For example, the detailed data aggregation apparatus aggregates the transcribed/replenished detailed data in a unit of common item "account title".

Accordingly, the detailed data aggregation apparatus according to the first embodiment can easily and flexibly aggregates the detailed data respectively input to a plurality of core systems or the like corresponding to the analysis purpose, and can easily track the detailed data, which is the basis of the aggregated data.

[Configuration of Detailed Data Aggregation Apparatus According to First Embodiment]

Figure 2:
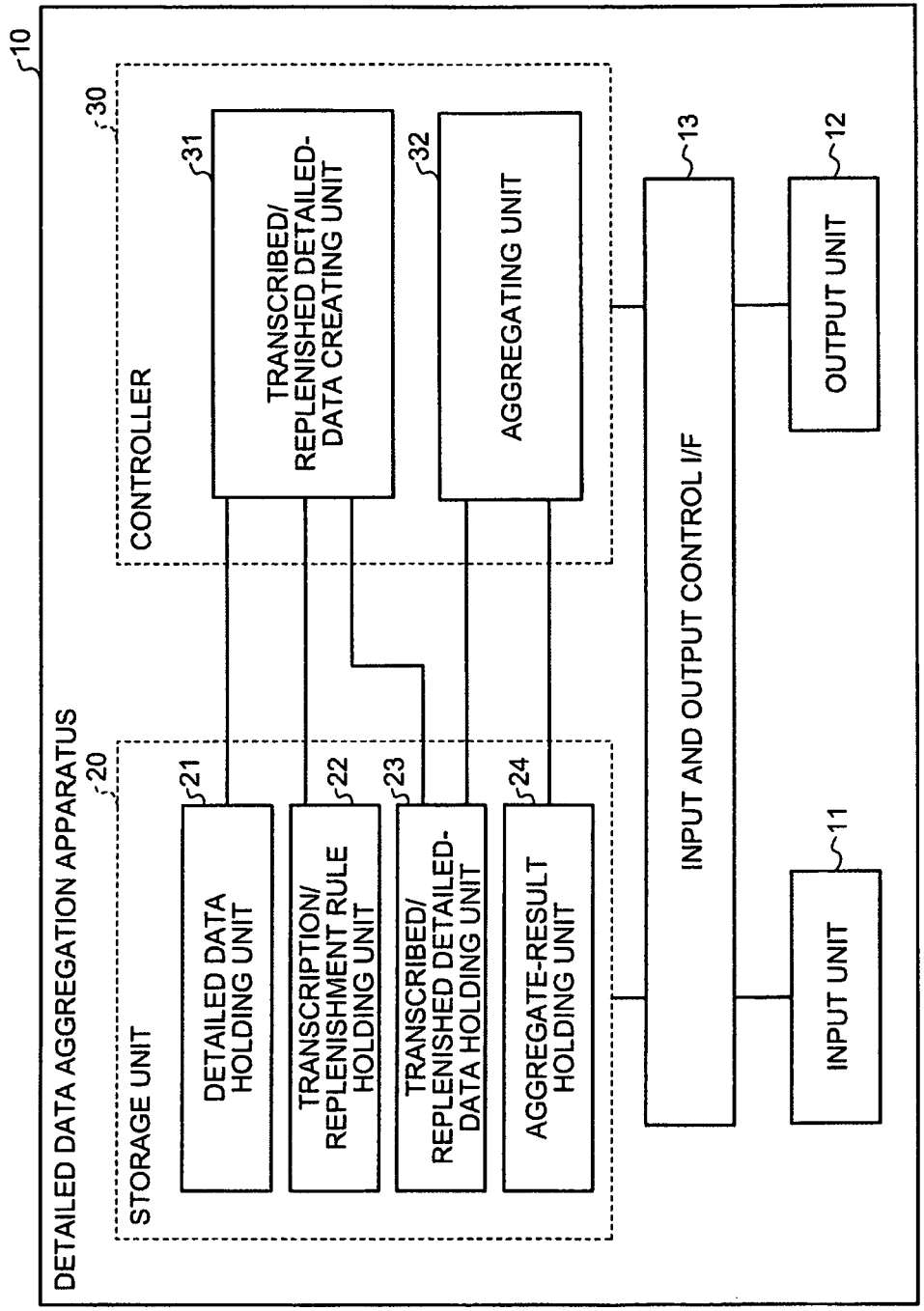
FIG. 2 is a block diagram of a configuration of the detailed data aggregation apparatus according to the first embodiment.
Figure 9:
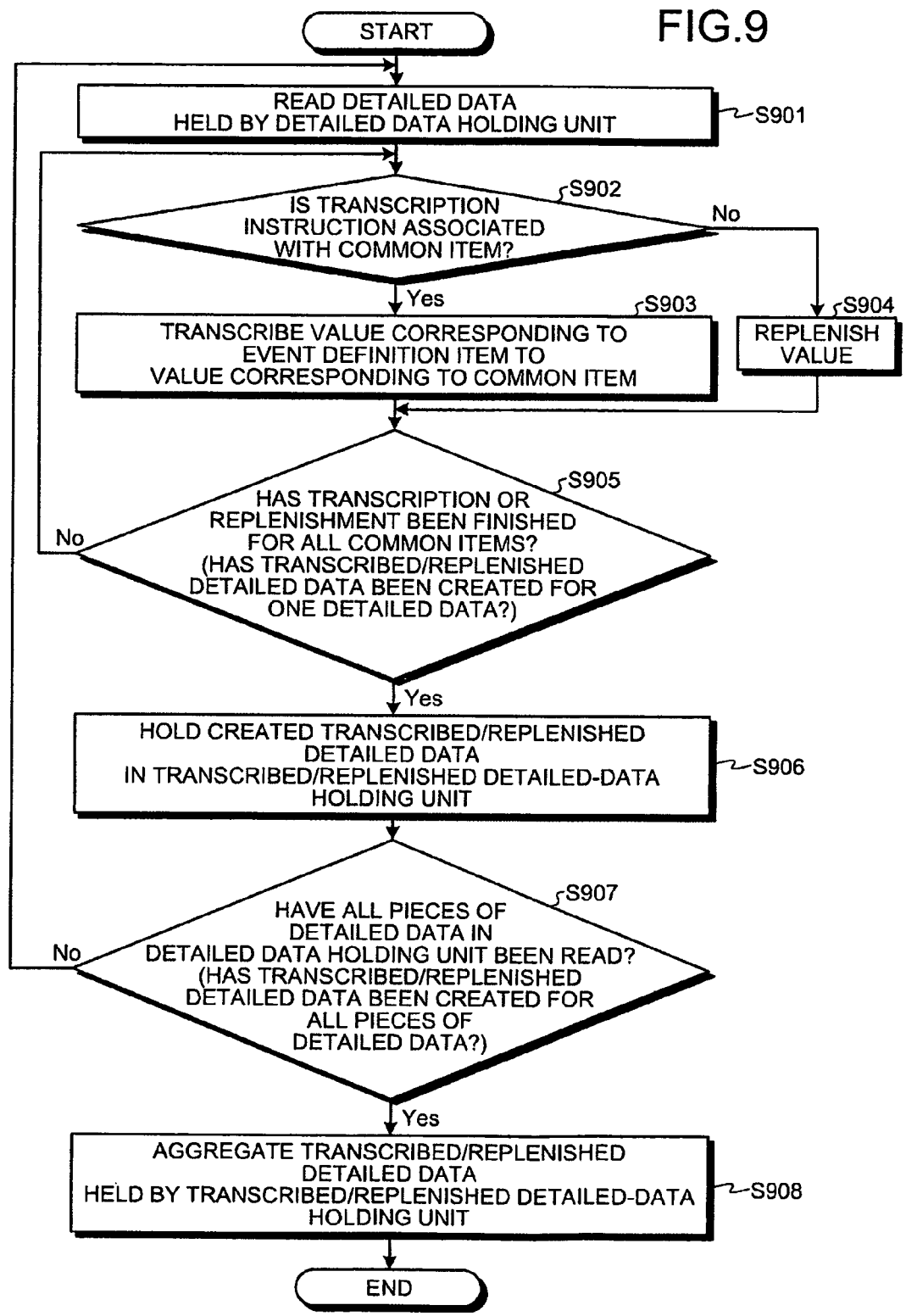
FIG. 9 is a flowchart of a process procedure performed by the detailed data aggregation apparatus according to the first embodiment.

The detailed data aggregation apparatus according to the first embodiment is explained next with reference to FIGS. 2 to 8. FIG. 2 is a block diagram of a configuration of the detailed data aggregation apparatus according to the first embodiment, FIG. 3 is an explanatory diagram of the detailed data holding unit, FIG. 4 is an explanatory diagram of the transcription/replenishment rule holding unit, FIG. 5 is an explanatory diagram of the transcribed/replenished detailed-data holding unit, FIGS. 6 and 7 are explanatory diagrams of an aggregate-result holding unit, and FIG. 8 is an explanatory diagram of an analysis example.

As depicted in FIG. 2, a detailed data aggregation apparatus 10 according to the first embodiment includes an input unit 11, an output unit 12, an input and output control I/F 13, a storage unit 20, and a controller 30.

The input unit 11 receives data used for various types of processes performed by the controller 30, an operation instruction for performing the various types of processes and the like, through a keyboard, a mouse, a recording medium, or communication. Specifically, the input unit 11 receives the detailed data held by a detailed data holding unit 21 described later, or receives an operation instruction (for example, instruction for instructing a common item or a combination of common items as a unit of aggregation) for instructing to perform aggregation by an aggregating unit 32 described later.

The output unit 12 outputs results of the various types of processes performed by the controller 30, the operation instruction for performing the various types of processes, and the like to a monitor or a printer. Specifically, the output unit 12 outputs a screen for inputting the detailed data by the input unit 11, the detailed data held by the detailed data holding unit 21, the transcription and replenishment rule held by a transcription/replenishment rule holding unit 22, the transcribed/replenished detailed data held by a transcribed/replenished detailed-data holding unit 23, or data of the aggregate results held by an aggregate-result holding unit 24 to the monitor.

The input and output control I/F 13 controls data transfer between the input unit 11 and the output unit 12, and between the storage unit 20 and the control unit 30.

The storage unit 20 stores data to be used for the various types of processes performed by the controller 30, and includes the detailed data holding unit 21, the transcription/replenishment rule holding unit 22, the transcribed/replenished detailed-data holding unit 23, and the aggregate-result holding unit 24 as depicted in FIG. 2, as members closely associated with the present invention. The detailed data holding unit 21 corresponds to a "detailed data holding procedure" described in claims, the transcription/replenishment rule holding unit 22 corresponds to a "transcription and replenishment rule holding procedure" described in the claims, and the transcribed/replenished detailed-data holding unit 23 corresponds to a "transcribed/replenished detailed data holding procedure" described in the claims.

The detailed data holding unit 21 holds the detailed data of a plurality of events. Specifically, the detailed data holding unit 21 holds the detailed data of events such as the "budget system" and the "order receiving system", and the held detailed data is used for a process performed by a transcribed/replenished detailed-data creating unit 31 described later.

For example, the detailed data holding unit 21 holds the detailed data as depicted in FIG. 3. The number of (1) to (16) depicted in FIG. 3 are numbers of convenience required for explaining the detailed data holding unit 21 provided on the drawing, which are not included in the detailed data held by the detailed data holding unit. In the first embodiment, these numbers are assumed as the order in which the detailed data are created in the respective systems.

In FIG. 3, the detailed data holding unit 21 in the first embodiment holds detailed data ((1) to (3)) of the "budget system", detailed data (4)) of the "order receiving system", detailed data ((5) and (12)) of a "subcontract cost system", detailed data ((6), (9), (13), and (14)) of a "worksheet system", detailed data ((7) and (11)) of a "system for settlement of travel expenses", detailed data ((8) and (10)) of a "system for material cost or the like", and detailed data ((15)) of a "sales system" as the core systems (events).

The detailed data (1) of the "budget system" is explained as one example. In FIG. 3, the detailed data (1) includes items of "input management number", "input system category", "department code", "transaction date", "account title", "slip No.", and "amount". The items (management items) of "input management number" and "input system category" are imparted to the detailed data by the detailed data holding unit 21 at the time of receiving the detailed data of the "budget system", and are different from the event definition items constituting the detailed data. The items of "department code" and "transaction date" are "common items between rules", which are common to a plurality of transcription and replenishment rules when the transcription/replenishment rule holding unit 22 holds a plurality of transcription and replenishment rules, and are imparted to the detailed data at the time of receiving the detailed data of the "budget system" by the detailed data holding unit 21, which are different from the event definition items constituting the detailed data. The items of "account title", "slip No.", and "amount" are ultimately the event definition items constituting the detailed data of the "budget system".

The detailed data (1) is data including a value corresponding to the event definition item. That is, the detailed data (1) is data including "80909 amount of sales" which is the value corresponding to the item of "account title", "Y001" which is the value corresponding to the item of "slip No.", and "¥5,000,000" which is the value corresponding to the item of "amount".

Likewise, the detailed data (4) of the "order receiving system" is explained as one example. As depicted in FIG. 3, in the case of detailed data (4), the item of "slip No.", "amount", "slip note", "predicted cost" and "scheduled date for sales" are the event definition items constituting the detailed data of the "order receiving system". The detailed data (4) includes "J001", "¥1,000,000", "construction of management system", "¥800,000", and "30 June". Thus, the detailed data (1) of the "budget system" and the detailed data (4) of the "order receiving system" include different "event definition items".

The detailed data holding unit 21 receives an input of the detailed data every time the detailed data is created in the respective systems and holds the detailed data, or holds the detailed data stored for each system at a time.

The transcription/replenishment rule holding unit 22 holds the transcription and replenishment rule. Specifically, the transcription/replenishment rule holding unit 22 holds the transcription and replenishment rule in which a plurality of common items, which are common to the different events as a minimum unit of aggregation, are defined and in which at least one of the transcription instruction (for instructing to transcribe a value corresponding to the event definition item to a value corresponding to the common item) and the replenishment instruction (for instructing to replenish a value to be replenished as the value corresponding to the common item) is described, associated with each common item for each event. The held transcription and replenishment rule is used for the process performed by the transcribed/replenished detailed-data creating unit 31.

For example, the transcription/replenishment rule holding unit 22 holds the transcription and replenishment rule as depicted in FIG. 4. FIG. 4 depicts a part of the transcription and replenishment rule for convenience' sake of explanation. As depicted in FIG. 4, the transcription/replenishment rule holding unit 22 holds the transcription and replenishment rule, in which "recorded identification category", "account title", "recorded date", and "amount" are defined as the common items, and the transcription instruction and the replenishment instruction are described, in association with each common item for each event such as "08 budget" (budget system), "01 order acceptance" (order receiving system), and "02 sales" (sales system"). For example, the transcription and replenishment rule associated with the common item "account title" of "08 budget" is 'transcribe "account title"'. In other words, the transcription and replenishment rule instructs to transcribe the value corresponding to the event definition item "account title" constituting the detailed data of the "budget system" as the "value corresponding to the common item "account title". Further, for example, the transcription and replenishment rule associated with the common item "account title" of "01 order acceptance" is "80909 amount of sales". In other words, the transcription and replenishment rule instructs "to replenish "80909 amount of sales" for the "common item "account title" of the order receiving system".

The transcription/replenishment rule holding unit 22 holds the transcription and replenishment rule beforehand by receiving an input by a user who uses the detailed data aggregation apparatus 10.

The transcribed/replenished detailed-data holding unit 23 holds the transcribed/replenished detailed data created from the detailed data. Specifically, the transcribed/replenished detailed-data holding unit 23 holds the transcribed/replenished detailed data created by the transcribed/replenished detailed-data creating unit 31 from the detailed data held by the detailed data holding unit 21, and the held transcribed/replenished detailed data is used for the process performed by the aggregating unit 32.

For example, the transcribed/replenished detailed-data holding unit 23 holds the transcribed/replenished detailed data as depicted in FIG. 5. FIG. 5 depicts the transcribed/replenished detailed data created from the detailed data (detailed data held by the detailed data holding unit 21) as depicted in FIG. 3. The transcribed/replenished detailed-data holding unit 23 holds, as depicted in FIG. 5, the transcribed/replenished detailed data including "management items", "common items", "common items between rules", and "event definition items". In FIG. 5, only "recorded identification category", "account title", "recorded date", "month", and "segment" are listed as the "common items". For example, the item of "amount" is classified as the "event definition items"; however, in the first embodiment, the item of "amount" is the "event definition item" and also one of the "common items" common to the different events as the minimum unit of aggregation.

The transcribed/replenished detailed-data holding unit 23 holds the transcribed/replenished detailed data by a method of holding the transcribed/replenished detailed data one by one created by the transcribed/replenished detailed-data creating unit 31 one by one every time the detailed data is held by the detailed data holding unit 21, or a method of holding the transcribed/replenished detailed data at a time created by the transcribed/replenished detailed-data creating unit 31 at a time from the detailed data stored in the detailed data holding unit 21. The number of (1) to (16) in FIG. 5 are numbers of convenience required for explaining the transcribed/replenished detailed-data holding unit 23 provided on the drawing, which are not included in the transcribed/replenished detailed data held by the transcribed/replenished detailed-data holding unit 23. These numbers are assumed as the order in which the detailed data are created in the respective systems, which is a source for creating the transcribed/replenished detailed-data, and correspond to the numbers imparted in the drawing in FIG. 3.

That is, the transcribed/replenished detailed data of (1) in FIG. 5 is created by the transcribed/replenished detailed-data creating unit 31 from the detailed data of (1) in FIG. 3. The numbers not corresponding to the detailed data in FIG. 3 such as (4)-1, (10)-1, (12)-1, (15)-1, and (16)-1 will be described in detail in the explanations of the transcribed/replenished detailed-data creating unit 31.

The aggregate-result holding unit 24 holds the aggregate result obtained by aggregating the transcribed/replenished detailed data. Specifically, the aggregate-result holding unit 24 holds the aggregate result obtained by aggregating the transcribed/replenished detailed data, which are held by the transcribed/replenished detailed-data holding unit 23, by the aggregating unit 32. The held aggregate result is output to the output unit 12 by the user who uses the detailed data aggregation apparatus 10.

For example, the aggregate-result holding unit 24 holds the aggregate result depicted in FIGS. 6 and 7. FIGS. 6 and 7 depict the aggregate result obtained by aggregating the transcribed/replenished detailed data (transcribed/replenished detailed data held by the transcribed/replenished detailed-data holding unit 23) as depicted in FIG. 5. As depicted in FIG. 6, the aggregate-result holding unit 24 holds the aggregate result of the transcribed/replenished detailed data aggregated in a unit of combination of common items, for example, "recorded identification category", "account title", "month", "department code", and "amount". Further, as depicted in FIG. 7, the aggregate-result holding unit 24 holds the aggregate result of the transcribed/replenished detailed data aggregated in a unit of combination of common items, for example, "recorded identification category", "account title", "month", "segment", and "amount".

The number of (1) to (16) in FIGS. 6 and 7 are numbers of convenience required for explaining the aggregate-result holding unit 24 provided on the drawings, which are not the aggregate result held by the aggregate-result holding unit 24. For example, the meaning of (5) and (8) on the first row in FIG. 6 is that the aggregate result on the first row is obtained by aggregating the transcribed/replenished detailed data of (5) and (8) in FIG. 5. Further, the signs of (a) to (m) in FIGS. 6 and 7 are signs of convenience required for explaining the aggregate-result holding unit 24 provided on the drawings, and these are not included in the aggregate result held by the aggregate-result holding unit 24. For example, the sign of (g) on the seventh row in FIG. 6 indicates how the aggregate result on the seventh row is reflected in an analysis result (see FIG. 8) described later.

The aggregate result held by the aggregate-result holding unit 24 is to be analyzed by a front-end application, and, for example, the analysis result depicted in FIG. 8 is provided to the user. In FIG. 8, (A) is an example of the analysis result of the aggregate result in FIG. 6 held by the aggregate-result holding unit 24, and (B) is an example of the analysis result of the aggregate result in FIG. 7 held by the aggregate-result holding unit 24.

The controller 30 controls the detailed data aggregation apparatus 10 to execute the various types of processes, and includes, as depicted in FIG. 2, the transcribed/replenished detailed-data creating unit 31 and the aggregating unit 32 as members closely associated with the present invention. The transcribed/replenished detailed-data creating unit 31 corresponds to a "transcribed/replenished detailed-data creating procedure" described in the claims and the aggregating unit 32 corresponds to an "aggregating procedure" describe in the claims.

The transcribed/replenished detailed-data creating unit 31 creates the transcribed/replenished detailed data including values corresponding to the common items from each of the detailed data. Specifically, with respect to each piece of the detailed data held by the detailed data holding unit, the transcribed/replenished detailed-data creating unit 31 transcribes the value corresponding to the event definition item constituting the detailed data as the value corresponding to the common item according to the transcription instruction, for the common item being associated with the transcription instruction in the transcription and replenishment rule held by the transcription/replenishment rule holding unit 22, and replenishes a value according to the replenishment instruction, for the common item being associated with the replenishment instruction in the transcription and replenishment rule, thereby creating the transcribed/replenished detailed data from each of the detailed data. The created transcribed/replenished detailed data is held by the transcribed/replenished detailed-data holding unit 23.

For example, a flow of the process for creating the transcribed/replenished detailed data from the detailed data in (1) in FIG. 8 is explained. The transcribed/replenished detailed-data creating unit 31 refers to the transcription and replenishment rule held by the transcription/replenishment rule holding unit 22 with respect to the detailed data (detailed data in (1) in FIG. 3) held by the detailed data holding unit 21. For example, if it is assumed that the transcription and replenishment rule as depicted in FIG. 4 is held, because the replenishment instruction is associated with the common item "recorded identification category", a value ("04 budget") is replenished according to the replenishment instruction. Further, because the transcription instruction is associated with the common item "account title", a value ("80909 amount of sales") corresponding to the event definition item "account title" constituting the detailed data is transcribed according to the transcription instruction. Because the transcription instruction is associated with the common item "recorded date", a value ("1 March") corresponding to the event definition item "recorded date" constituting the detailed data is transcribed according to the transcription instruction. Because the transcription instruction is associated with the common item "amount", a value ("¥5,000,000") corresponding to the event definition item "amount" constituting the detailed data is transcribed according to the transcription instruction. As a result, the transcribed/replenished detailed-data creating unit 31 creates the transcribed/replenished detailed data in (1) in FIG. 5. Explanations for the common items such as "month" and "segment" in (1) in FIG. 5 will be omitted; however, the transcription and replenishment rule held by the transcription/replenishment rule holding unit 22 is referred to in the same manner, to transcribe or replenish a value, thereby creating the transcribed/replenished detailed data.

A flow of the process for creating the transcribed/replenished detailed data is explained regarding the numbers not corresponding to the detailed data in FIG. 3 such as (4)-1, (10)-1, (12)-1, (15)-1, and (16)-1. In the first embodiment, the detailed data aggregation apparatus 10 holds the detailed data at each stage of a process executed though multiple stages. When the detailed data at a certain stage is received, the detailed data aggregation apparatus 10 creates forecast detailed data indicating a content predicted from the detailed data for a stage next to the certain stage and subsequent stages, and when it is determined that there is a stage immediately previous to the certain stage, creates and holds offset detailed data having a content for offsetting the forecast detailed data created at the immediately previous stage.

For example, in the first embodiment, it is assumed that a material system is a process executed through the stages of "order placement" and "acceptance". Accordingly, the detailed data aggregation apparatus 10 holds, as depicted in FIG. 3, detailed data (8) of "order placement" and detailed data (10) of "acceptance" in the detailed data holding unit 21. Upon reception of the detailed data of "order placement", the detailed data aggregation apparatus 10 creates the forecast detailed data having the content predicted from the detailed data relating to "acceptance", which is the next stage. As depicted in (8) in FIG. 5, a value of "12021 work-in-process general account" is replenished as the common item "account title", and "¥100,000" is recorded as the common item "amount". This may mean creation of the forecast detailed data.

Subsequently, the detailed data aggregation apparatus 10 determines whether there is a stage immediately previous to "order placement". However, in the first embodiment, there is no stage immediately previous to "order placement". Upon reception of the detailed data relating to "acceptance", because there is no next stage, the detailed data aggregation apparatus 10 does not create the forecast detailed data. However, because it is determined that there is the stage "order placement" immediately previous to "acceptance", the detailed data aggregation apparatus 10 creates and holds offset detailed data having a content for offsetting the forecast detailed data created at the immediately previous stage "order placement". As depicted in (10)-1 in FIG. 5, a value of "03 reconcilement of order" is replenished as the common item "recorded identification category", a value of "12021 work-in-process general account" is replenished as the common item "account title", and "−¥100,000" is recorded as the common item "amount". That is, the offset detailed data in (10)-1 has a content for offsetting the forecast detailed data in (8).

In the first embodiment, a case in which the detailed data aggregation apparatus 10 creates the forecast detailed data and the offset detailed data has been explained; however, the present invention is not limited thereto, and the present invention is also applicable to a case in which the detailed data aggregation apparatus 10 does not create the forecast detailed data or offset detailed data.

The aggregating unit 32 aggregates the transcribed/replenished detailed data. Specifically, the aggregating unit 32 aggregates the transcribed/replenished detailed data held by the transcribed/replenished detailed-data holding unit 23 in a unit of predetermined common item specified as a unit of aggregation or a unit of combination of predetermined common items, and the aggregated result is held by the aggregate-result holding unit 24.

For example, when the aggregating unit 32 aggregates the transcribed/replenished detailed data in FIG. 5 in a unit of combination of common items specified as the unit of aggregation ("recorded identification category", "account title", "month", "department code", and "amount"), the aggregate result depicted in FIG. 6 is held by the aggregate-result holding unit 24.

[Process Procedure Performed by Detailed Data Aggregation Apparatus According to First Embodiment]

One example of a process performed by the detailed data aggregation apparatus according to the first embodiment is explained with reference to FIG. 6. FIG. 6 is a flowchart of a process procedure performed by the detailed data aggregation apparatus according to the first embodiment.

In the detailed data aggregation apparatus 10 according to the first embodiment, the transcribed/replenished detailed-data creating unit 31 reads the detailed data held by the detailed data holding unit 21 (Step S901).

Next, in the detailed data aggregation apparatus 10, the transcribed/replenished detailed-data creating unit 31 refers to the transcription and replenishment rule held by the transcription/replenishment rule holding unit 22 with respect to the read detailed data, to determine whether the transcription instruction is associated with the common item (Step S902).

When the transcription instruction is associated with the common item (YES at Step S902), the transcribed/replenished detailed-data creating unit 31 transcribes a value corresponding to the event definition item constituting the detailed data as a value corresponding to the common item (Step S903). On the other hand, when the transcription instruction is not associated with the common item (NO at Step S902), the transcribed/replenished detailed-data creating unit 31 replenishes a value according to the replenishment instruction (Step S904).

Subsequently, in the detailed data aggregation apparatus 10, the transcribed/replenished detailed-data creating unit 31 determines whether transcription or replenishment has been finished for the common items, that is, whether the transcribed/replenished detailed data has been created for one read detailed data (Step S905).

When the transcribed/replenished detailed data has not been created (NO at Step S905), in the detailed data aggregation apparatus 10, the transcribed/replenished detailed-data creating unit 31 returns to the process for determining whether the transcription instruction is associated with the common item. On the other hand, when the transcribed/replenished detailed data has been created (YES at Step S905), the detailed data aggregation apparatus 10 holds the created transcribed/replenished detailed data in the transcribed/replenished detailed-data holding unit 23 (Step S906).

Subsequently, the detailed data aggregation apparatus 10 determines whether all peaces of detailed data in the detailed data holding unit 21 have been read, that is, whether the transcribed/replenished detailed data has been created for all the pieces of detailed data (Step S907).

When the transcribed/replenished detailed data has not been created for all the elements of detailed data (NO at Step S907), the detailed data aggregation apparatus 10 returns to the process for reading the detailed data. On the other hand, when the transcribed/replenished detailed data has been created for all the elements of detailed data (YES at Step S907), in the detailed data aggregation apparatus 10, the aggregating unit 32 aggregates the transcribed/replenished detailed data held by the transcribed/replenished detailed-data holding unit 23 (Step S908).

In this manner, the detailed data aggregation apparatus according to the first embodiment can easily and flexibly aggregate the detailed data respectively input to a plurality of core systems or the like corresponding to the analysis purpose, and can easily track the detailed data, which is the basis of the aggregated data.

[Effects of First Embodiment]

As described above, according to the first embodiment, the detailed data aggregation apparatus aggregates the detailed data between different events. Each piece of the detailed data includes a value corresponding to the event definition item defined for each event as the item constituting the data. The detailed data of a plurality of events are held. The transcription and replenishment rule is held, in which a plurality of the common items, which are common to different events as a minimum unit of aggregation, are defined and in which at least one of the transcription instruction (for instructing to transcribe a value corresponding to the event definition item to a value corresponding to the common item) and the replenishment instruction (for instructing a value to be replenished as the value corresponding to the common item) is described, associated with each common item for each event. With respect to the held detailed data, the value corresponding to the event definition item constituting the detailed data is transcribed as the value corresponding to the common item according to the transcription rule, for the common item being associated with the transcription instruction in the held transcription and replenishment rule, or a value is replenished according to the replenishment rule for the common item being associated with the replenishment instruction in the transcription and replenishment rule, thereby creating transcribed/replenished detailed data including values corresponding to the common items from the respective detailed data. The created transcribed/replenished detailed data is held, and the held transcribed/replenished detailed data is aggregated in a unit of predetermined common item specified as a unit of aggregation or in a unit of combination of predetermined common items. This is a method of creating and holding transcribed/replenished detailed data including values corresponding to the common items (a plurality of common items, which are common to different events as the minimum unit of aggregation) and aggregating the transcribed/replenished detailed data. Therefore, as compared to a method in which the two-stage aggregation needs to be performed for each analysis purpose (for example, a method of aggregating detailed data for a group of detailed data including the common items for each element corresponding to the analysis purpose, and then aggregating the detailed data aggregated for each group for a plurality of groups), the detailed data respectively input to the core systems or the like can be aggregated more easily and flexibly corresponding to the analysis purpose, and the detailed data, which is the basis of the aggregated data, can be easily tracked.

Further, according to the first embodiment, because the detailed data including the value corresponding to the common item between the rules defined as the item common to a plurality of transcription and replenishment rules and the value corresponding to the event definition item is held, the load at the time of creating the transcribed/replenished detailed data for each of the transcription and replenishment rules can be reduced and overlapping processes between the transcription and replenishment rules can be reduced, in addition to the effects described above.

[b] Second Embodiment

The detailed data aggregation apparatus according to the first embodiment has been explained. However, the present invention can be implemented in various different configurations other than the above embodiment. Therefore, various different configurations are explained below as a detailed data aggregation apparatus according to a second embodiment.

[Addition of Common Items]

In the first embodiment, addition of the common item in the detailed data aggregation apparatus has not been particularly mentioned. However, the present invention can be also applied to a configuration in which the detailed data aggregation apparatus further includes a common-item addition receiving unit that receives an additional common item. In this case, the transcription/replenishment rule holding unit in the detailed data aggregation apparatus further holds a transcription and replenishment rule describing a transcription instruction for instructing to transcribe a value corresponding to the event definition item to a value corresponding to the additional common item and a replenishment instruction for instructing to replenish a value to be replenished as the value corresponding to the value of the additional common item. The aggregating unit in the detailed data aggregation apparatus aggregates the transcribed/replenished detailed data in a unit of predetermined common item or in a unit of combination of common items including the additional common item. Accordingly, in addition to the effects of the first embodiment, when it is desired to add a common item corresponding to the analysis purpose, easy respondence is possible.

[Plurality of Transcription and Replenishment Rules]

In the first embodiment, a case in which the detailed data aggregation apparatus holds one transcription and replenishment rule has been explained; however, the present invention is not limited thereto, and the present invention can be also applied to a case in which the detailed data aggregation apparatus holds a plurality of transcription and replenishment rules. In this case, the transcription/replenishment rule holding unit in the detailed data aggregation apparatus holds a plurality of transcription and replenishment rules and the transcribed/replenished detailed-data creating unit creates the transcribed/replenished detailed data for each of the held transcription and replenishment rules. Accordingly, in addition to the effects of the first embodiment, analyses in which different common items are defined, such as benefit-risk analysis and cost analysis can be handled.

[Holding of Detailed Data]

In the first embodiment, a method of holding the detailed data including the value corresponding to the common item between rules defined as the item common to a plurality of transcription and replenishment rules and the value corresponding to the event definition item has been explained. However, the present invention is not limited thereto, and the present invention can be also applied to a method in which the common item between rules is firstly provided at a time when the transcribed/replenished detailed-data creating unit creates the transcribed/replenished detailed data, like the normal common item.

[Programs]

The various types of processes explained in the first embodiment can be realized by executing a program prepared beforehand by a computer such as a personal computer or workstation. Therefore, one example of a computer that executes a detailed data aggregation program having the same functions as those in the first embodiment is explained with reference to FIG. 10. FIG. 18 depicts a computer that executes the detailed data aggregation program.

Figure 10:
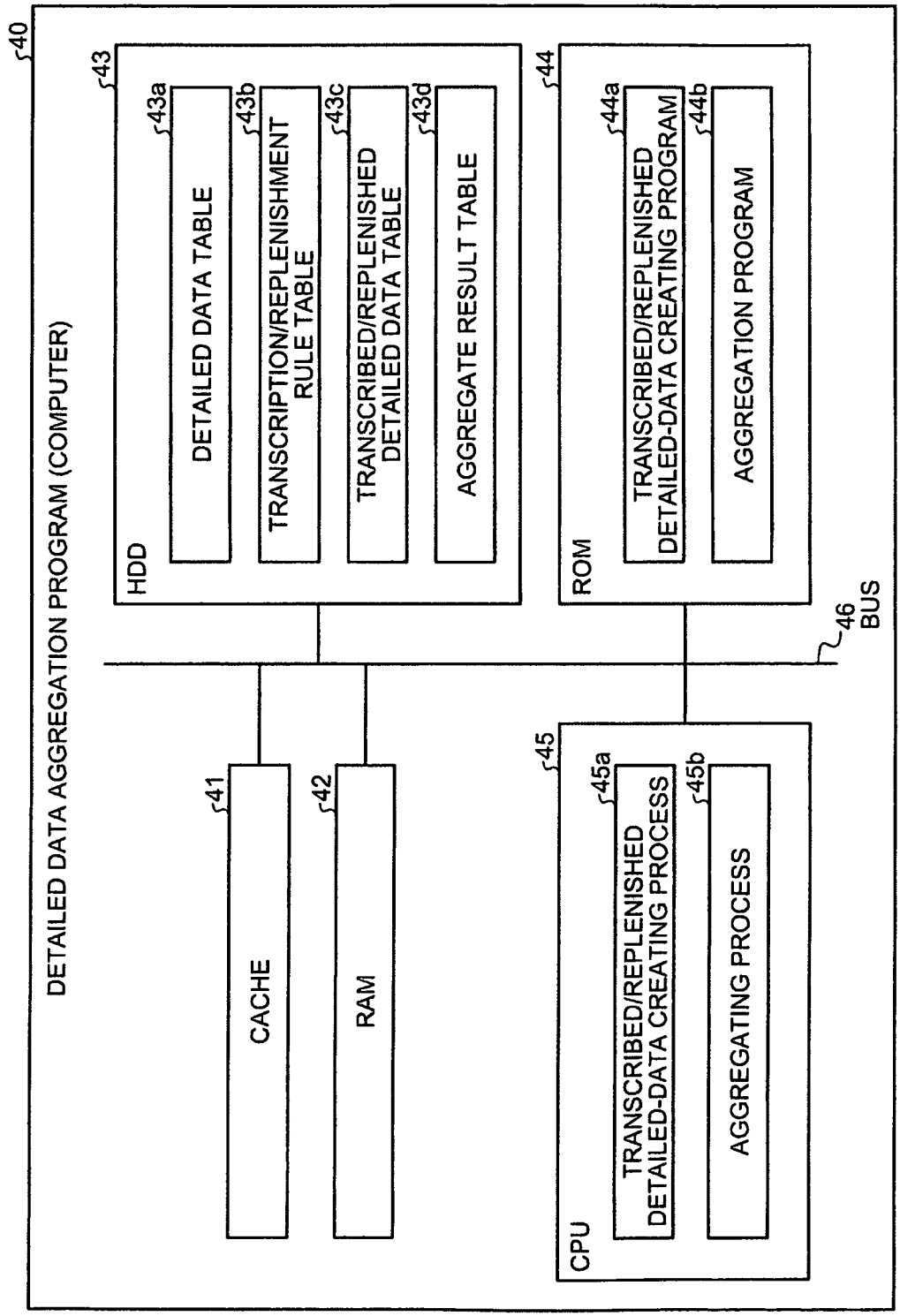
FIG. 10 depicts a computer that executes a detailed data aggregation program.

As depicted in FIG. 10, a computer 40 as the detailed data aggregation program is configured by connecting a cache 41, a RAM 42, an HDD 43, a ROM 44, and a CPU 45 by a bus 46. A detailed data aggregation program that demonstrates the same functions as those in the first embodiment, that is, as depicted in FIG. 10, a forecast detailed-data creating program 44a and a determining program 44b are stored beforehand in the ROM 44.

The CPU 45 reads and executes these programs 44a and 44b, so that the respective programs 44a and 44b can be achieved as a transcribed/replenished detailed-data creating process 45a and an aggregating process 45b, as depicted in FIG. 10. The processes 45a and 45b correspond to the transcribed/replenished detailed-data creating unit 31 and the aggregating unit 32 depicted in FIG. 2, respectively.

A detailed data table 43a, a transcription/replenishment rule table 43b, a transcribed/replenished detailed data table 43c, and an aggregate result table 43d are provided in the HDD 43, as depicted in FIG. 10. The tables 43a, 43b, 43c and 43d correspond to the detailed data holding unit 21, the transcription/replenishment rule holding unit 22, the transcribed/replenished detailed-data holding unit 23, and the aggregate-result holding unit 24 depicted in FIG. 2, respectively.

The respective programs 44a and 44b do not need to be stored in the ROM 44, and for example, can be stored in a "portable physical medium" such as a flexible disk (FD), CD-ROM, MO disk, DVD disk, magneto-optical disk, or IC card inserted into the computer 40, a "fixed physical medium" such as a hard disk drive (HDD) provided inside or outside of the computer 40, or "another computer (or server)" connected to the computer 40 via a public line, the Internet, LAN, or WAN, so that the computer 40 reads the program therefrom and executes the program.

[Others]

Among the respective processes explained in the embodiments, all or part of the processes explained as being automatically performed can be manually performed, or all or part of the processes explained as being manually performed (for example, an instruction of specifying common items or combinations of common items as a unit of aggregation, and input of transcription/replenishment rules) can be automatically performed through a known method. In addition, the process procedures, control procedures, specific names, and information including various data and parameters explained in the specification and depicted in the drawings can be arbitrarily changed, unless otherwise specified.

Each component of the apparatuses depicted in the drawings (for example, FIG. 2 and the like) is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various load and the state of use. Furthermore, all or arbitrary part of the processing functions performed in each component can be realized by a CPU and a program analyzed and executed on the CPU, or can be realized as hardware with a wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A computer readable storage medium containing instructions for aggregating accounting data between different events, each accounting data outputted by each event, wherein the instructions, when executed by a computer, causes the computer to perform:
   transcribing, for creating a first accounting data including a value of a common item from a second accounting data including a value of an event definition item defined for each event, when the second accounting data has a same item as the common item of the first accounting data, a value of the same item in the second accounting data to a value of a corresponding common item in the first accounting data by using a rule defining a relation between the common item and the event definition item;
   replenishing, for creating the first accounting data from the second accounting data, when the second accounting data does not have a same item as the common item of the first accounting data, a value by using a rule defining a replenishment value for the common item; and
   aggregating the first accounting data accumulated to a memory after creation from the second accounting data.

2. The computer readable storage medium according to claim 1, the instructions further cause the computer to perform:
   receiving an additional item of the first accounting data, wherein
   the transcribing includes transcribing the value in the second accounting data by using the rule defining a relation between the common item added in the additional item and the event definition item; and
   the replenishing includes replenishing the value by using the rule defining the replenishment value for the common item added in the additional item.

3. The computer readable storage medium according to claim 1, wherein
   the transcribing includes transcribing the value in the second accounting data by using a plurality of rules, each first accounting data for each of the rules; and
   the replenishing includes replenishing the value by using a plurality of rules, each first accounting data for each of the rules.

4. The computer readable storage medium according to claim 3, wherein
   the transcribing includes transcribing the value in the second accounting data to the value in each first accounting data for each of the rules, each first accounting data including a common item between the rules; and
   the replenishing includes replenishing the value in each first accounting data for each of the rules, each first accounting data including a common item between the rules.

5. An accounting data aggregation apparatus for aggregating accounting data between different events, each accounting data outputted by each event, the apparatus comprising:
   a memory that holds a rule for creating a first accounting data including a value of a common item from a second accounting data including a value of an event definition item defined for each event, the rule defining a relation between the common item and the event definition item and defining a replenishment value for the common item; and a processor coupled to the memory, wherein the processor executes transcribing, for creating the first accounting data from the second accounting data, when the second accounting data has a same item as the common item of the first accounting data, a value of the same item in the second accounting data to a value of a corresponding common item in the first accounting data by using the rule held by the memory;

replenishing, for creating the first accounting data from the second accounting data, when the second accounting data does not have a same item as the common item of the first accounting data, a value by using the rule held by the memory; and aggregating the first accounting data accumulated to the memory after creation from the second accounting data.

6. The accounting data aggregation apparatus according to claim 5, the processor further executes receiving an additional item of the first accounting data, wherein the transcribing includes transcribing the value in the second accounting data by using the rule defining a relation between the common item added in the additional item and the event definition item; and the replenishing includes replenishing the value by using the rule defining the replenishment value for the common item added in the additional item.

7. The accounting data aggregation apparatus according to claim 5, wherein the transcribing includes transcribing the value in the second accounting data by using a plurality of rules, each first accounting data for each of the rules; and the replenishing includes replenishing the value by using a plurality of rules, each first accounting data for each of the rules.

8. The accounting data aggregation apparatus according to claim 7, wherein the transcribing includes transcribing the value in the second accounting data to the value in each first accounting data for each of the rules, each first accounting data including a common item between the rules; and the replenishing includes replenishing the value in each first accounting data for each of the rules, each first accounting data including a common item between the rules.

9. An accounting data aggregation method of aggregating accounting data between different events, each accounting data outputted by each event, the method comprising:

transcribing, using a processor, for creating a first accounting data including a value of a common item from a second accounting data including a value of an event definition item defined for each event, when the second accounting data has a same item as the common item of the first accounting data, a value of the same item in the second accounting data to a value of a corresponding common item in the first accounting data by using a rule defining a relation between the common item and the event definition item;

replenishing, using the processor, for creating the first accounting data from the second accounting data, when the second accounting data does not have a same item as the common item of the first accounting data, a value by using a rule defining a replenishment value for the common item; and aggregating, using the processor, the first accounting data accumulated to a memory after creation from the second accounting data.

10. The accounting data aggregation method according to claim 9, further comprising:

receiving, using the processor, an additional item of the first accounting data, wherein the transcribing includes transcribing the value in the second accounting data by using the rule defining a relation between the common item added in the additional item and the event definition item; and the replenishing includes replenishing the value by using the rule defining the replenishment value for the common item added in the additional item.

11. The accounting data aggregation method according to claim 9, wherein the transcribing includes transcribing the value in the second accounting data by using a plurality of rules, each first accounting data for each of the rules; and the replenishing includes replenishing the value by using a plurality of rules, each first accounting data for each of the rules.

12. The accounting data aggregation method according to claim 11, wherein the transcribing includes transcribing the value in the second accounting data to the value in each first accounting data for each of the rules, each first accounting data including a common item between the rules; and the replenishing includes replenishing the value in each first accounting data for each of the rules, each first accounting data including a common item between the rules.

* * * * *

UNITED STATES PATENT AND TRADEMARK OFFICE
CERTIFICATE OF CORRECTION

| | |
|---|---|
| PATENT NO. | : 8,601,011 B2 |
| APPLICATION NO. | : 12/457806 |
| DATED | : December 3, 2013 |
| INVENTOR(S) | : Yoshihiro Takagi et al. |

It is certified that error appears in the above-identified patent and that said Letters Patent is hereby corrected as shown below:

On the title page, In Column 1 item [75] (Inventors), Line 2, Delete "Kawasaki" and insert -- Kawakami --, therefor.

Signed and Sealed this
Twenty-fifth Day of March, 2014

Michelle K. Lee
*Deputy Director of the United States Patent and Trademark Office*